(12) United States Patent
Godinich (10) Patent No.: US 8,686,584 B2
(45) Date of Patent: Apr. 1, 2014

(54) HYDRO-ELECTRIC GENERATION METHOD AND SYSTEM WITH SALTWATER FLUME FOR AQUACULTURE

(75) Inventor: Stephen Lee Godinich, Houston, TX (US)

(73) Assignee: Stephen Lee Godinich, Houston, TX (US)

( * ) Notice: Subject to any disclaimer, the term of this patent is extended or adjusted under 35 U.S.C. 154(b) by 545 days.

(21) Appl. No.: 12/932,237

(22) Filed: Feb. 22, 2011

(65) Prior Publication Data

US 2012/0210944 A1 Aug. 23, 2012

(51) Int. Cl.
*F03B 13/00* (2006.01)
(52) U.S. Cl.
USPC .......................................................... 290/54
(58) Field of Classification Search
USPC ........................................ 290/54–55, 43–44
See application file for complete search history.

(56) References Cited

U.S. PATENT DOCUMENTS

| | | | | |
|---|---|---|---|---|
| 4,406,413 A | * | 9/1983 | Houle | 241/46.04 |
| 4,443,154 A | * | 4/1984 | Randolph | 416/11 |
| 2008/0223684 A1 | * | 9/2008 | Duffey et al. | 192/105 R |
| 2012/0138447 A1 | * | 6/2012 | Glynn | 202/189 |

* cited by examiner

*Primary Examiner* — Jean F Duverne (57) ABSTRACT

Embodiments that generate electrical power via hydro-electric systems that employ man-made flumes configured to support saltwater aquaculture are disclosed. Various embodiments pump water, such as saltwater or freshwater, into supply a man-made flume. The embodiments may generally employ a blade assembly to harness wind power and drive a mechanical pump that transfers the water into the man-made flume. The flumes in different embodiments may contain different forms of aquaculture, such as shrimp, fish, and crabs. As water flows through the flume, the continual fresh supply may continually aerate the water in the flume to support the aquatic life. Water exiting the flume may impact a turbine that is coupled to a generator to generate electrical power.

20 Claims, 4 Drawing Sheets

HYDRO-ELECTRIC GENERATION METHOD AND SYSTEM WITH SALTWATER FLUME FOR AQUACULTURE

BACKGROUND

The present invention generally relates to the field of saltwater aquaculture systems. More particularly, the present invention relates to methods and systems to generate electrical power via hydro-electric systems that employ man-made flumes configured to support saltwater aquaculture.

The demand for power is increasing dramatically with expanding industrialization and the escalating use of power-consuming equipment. The available natural resources, however, are continually being consumed and will eventually become increasingly scarce. Other sources of power, such as nuclear plants, are in disfavor because of environmental concerns over the disposal of the resulting waste and possible accidents. Fossil fuel, which is burned in thermal power stations, generates air pollution, including carbon dioxide which is suspected of causing warming of the atmosphere. On the other hand, using clean renewable energy may provide numerous benefits.

Wind is a renewable energy source. Turbines or towers which use the kinetic energy of wind to generate mechanical energy, and convert the mechanical energy to electricity are known. Wind towers or turbines typically have two or three blades which may face into or away from the wind. As the wind causes the blades to rotate, the shaft in the turbine spins. When connected to a generator, the spinning of the shaft drives the generator which produces electricity.

Wind power has the advantage of being a free, renewable energy source. Wind also has the drawback of providing only intermittent energy. The open oceans and coastal regions are a great source of wind energy. Wind towers take up a large amount of land and have recently been placed offshore. Offshore locations solve noise and sighting problems, but raise other ecological issues with support structure requirements. There remains a need to efficiently harness wind power and easily store it such that it the energy generated can be used whenever needed, with minimal ecological impact. Additionally, harnessing wind power in a manner that actually improves the ecology of areas surrounding the wind-power structures is virtually non-existent.

In regard to ecology and their importance to humans, aquaculture in human diets has recently attained renewed recognition due to dietary research comparing the health benefits of fish and other types of aquaculture to other types of meats. Consumer demand for fish and shrimp has increased, resulting in commercial farmers searching for new techniques for harvesting more fish while lowering costs to maximize profits. Aquaculture has gained attention as a viable alternative to commercial harvesting of wild fish and shrimp populations. Aquaculture is practiced in several different forms, which include pond aquaculture, tank aquaculture, and cage aquaculture.

Cage and pond cultivating systems have numerous disadvantages, such as not allowing for total monitoring and control of cultivation conditions, not enabling the aquaculture to be closely monitored for general growth, hygiene, or disease, nor allow for the easy handling of fish stock. Moreover, in the event that there is an outbreak of disease, the whole body of water may need to be treated and many hours may be required in order to clean the cages and nets.

Cage aquaculture has advantages, though, because fish, shellfish, and other aquatic species can be harvested more quickly and more efficiently without the use of fishing or trawling vessels and with a lower environmental impact. Moreover, aquaculture tanks may be located offshore or in under-used areas of large lakes, rivers, and estuaries. Aquaculture may also increase the availability of seafood and freshwater fish for public food consumption. Aquaculture also reduces the environmental impact of fishing by eliminating the use of nets for harvesting the farmed species and by reducing the impact of commercial harvesting on wild populations that can produce negative ecological results in a particular marine or freshwater environment.

As noted, aquaculture may be conducted by growing fish, prawns and other fresh and saltwater invertebrates in outdoor ponds. The ponds however eventually become polluted because feces, uneaten food and algae work their way to the bottom of the ponds. This makes the ponds almost impossible to clean. In addition large quantities of valuable water are required to keep these systems functional. Other disadvantages are also associated with outdoor aquaculture systems. For example pests can eat stock, adverse weather conditions such as floods can cause stock loss by washing the stock away and very hot weather can cause growth of algal blooms which can kill the stock. In addition in very hot or very cold weather, the stock will stop growing. Muddy waters or disturbed water can also cause the stock to have an unpalatable taste.

BRIEF SUMMARY

Following are detailed descriptions of embodiments depicted in the accompanying drawings. The descriptions are in such detail as to clearly communicate various aspects of the embodiments. However, the amount of detail offered is not intended to limit the anticipated variations of embodiments. On the contrary, the intention is to cover all modifications, equivalents, and alternatives of the various embodiments as defined by the appended claims. The detailed descriptions below are designed to make such embodiments obvious to a person of ordinary skill in the art.

Some embodiments comprise a method of rotating a blade assembly by wind, wherein the blade assembly is coupled to a mechanical pump assembly. The mechanical pump assembly transfers saltwater from a first elevation to an entry point of a man-made flume that comprises aquaculture, wherein the entry point is at a second elevation which is greater than the first elevation. The method further involves flowing saltwater in the man-made flume from the second elevation to an exit point at a third elevation, wherein the third elevation is greater than the first elevation. The method also involves turning a water turbine with saltwater that flows from the exit point of the flume and generating electrical power via a generator coupled to the water turbine.

Further embodiments comprise a system with a blade assembly to rotate a first shaft when the blade assembly is impacted by wind. The first shaft is substantially horizontal relative to ground and is coupled to a mill, which is also coupled to a second shaft, wherein the second shaft is substantially vertical relative to the ground. The mill is configured to rotate the second shaft in response to rotation of the first shaft for a pump coupled to the second shaft. The pump transfers saltwater from a body of water to a man-made flume comprises aquaculture and is at an elevation greater than the body of water. The system also comprises a turbine arranged to turn a shaft of a generator in response to saltwater flowing from the man-made flume, wherein the generator is configured to generate electrical power Even further embodiments comprise a system for supporting saltwater aquaculture. The system has a propeller assembly comprising a plurality of blades, wherein the propeller assembly is configured to be impacted by wind and rotate a shaft that is substantially vertical to the ground. The system also has a pump, coupled to the shaft, to pump saltwater from a body of saltwater into a man-made flume which comprises aquaculture. The system also has a turbine coupled to a generator, wherein the generator is configured to generate electricity in response to saltwater flowing from the man-made flume and impacting the turbine.

BRIEF DESCRIPTION OF THE SEVERAL VIEWS OF THE DRAWING

Aspects of the various embodiments will become apparent upon reading the following detailed description and upon reference to the accompanying drawings in which like references may indicate similar elements.

DETAILED DESCRIPTION

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Various embodiments may pump water, such as saltwater or freshwater, into supply a man-made flume. The embodiments may generally employ a blade assembly to harness wind power and drive a mechanical pump that transfers the water into the man-made flume. The flumes in different embodiments may contain different forms of aquaculture, such as shrimp, fish, and crabs. As water flows through the flume, the continual fresh supply may continually aerate the water in the flume to support the aquatic life. Water exiting the flume may impact a turbine that is coupled to a generator to generate electrical power.

Figure 1:
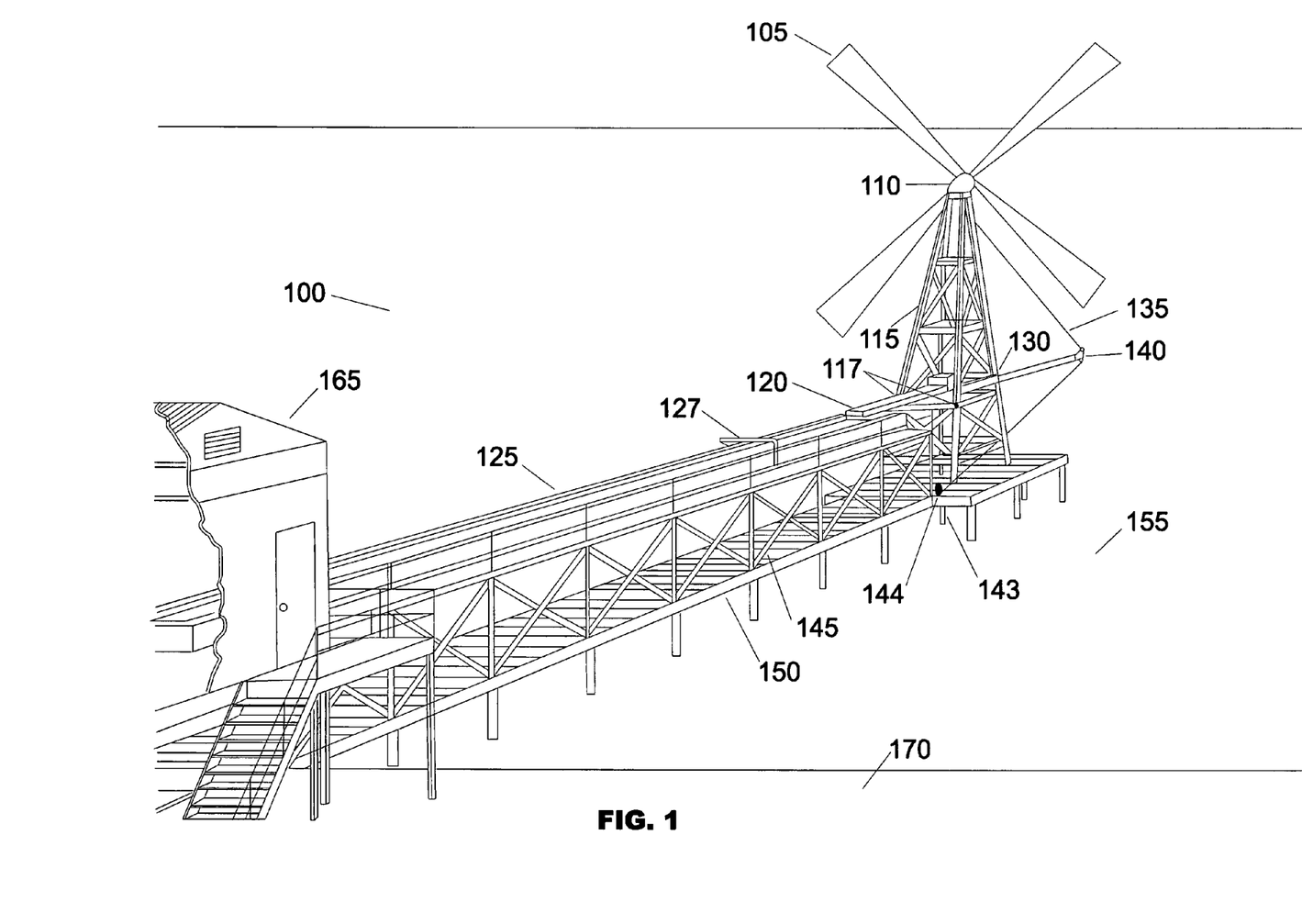
FIG. 1 illustrates a hydro-electric power generation system having a man-made flume configured to support aquaculture.

Turning now to the drawings, FIG. 1 illustrates a hydro-electric power generation system 100. System 100 employs a man-made flume 125 configured to support saltwater aquaculture. System 100 may capture wind by an impeller/propeller blade assembly 105. For example, in many embodiments, blade assembly 105 may comprise a predetermined number of blades, each blade configured to create a high pressure zone on the portion of the blade facing the wind and a low pressure zone on the back side portion of the blade that does not face the wind. The configuration of the blade, which may have a curved surface and have leading and trailing edges set at an angle relative to the direction of the wind flow direction, may cause the entire blade assembly to rotate about a shaft. The shaft may be substantially horizontal, and consequentially substantially parallel, with the ground 170. The number of blades will vary in different embodiments. Some embodiments may employ three blades. Other embodiments may employ 5, 6, 8, or more blades.

In some embodiments, blade assembly 105 may comprise blades that have variable pitch capability. For example, the blades of blade assembly 105 may capture the wind and translate it to drive the shaft, wherein the speed of the shaft may be coordinated as a function of rotations per minute (RPM) to maximize wind efficiency. Blade assembly 105 may implement a maximum pitch during conditions of low wind, or low wind speed, and implement a minimum pitch in conditions of high wind speeds. In other words, blade assembly 105 may maximize the rotational speed, or RPM, in low wind conditions and limit the rotational speed of the shaft in conditions of high wind speed in order to maximize pop efficiency. Limiting or varying the pitch of blade assembly 105 may also help reduce or limit friction to tolerable limits and stabilize the rotational speed of the shaft once the relative maximum output on the pump is reached. Further, the configuration of blade assembly 105 may vary from embodiment to embodiment. For example, many embodiments may employ a multi-bladed wind wheel, comprising a plurality of curved sails.

As FIG. 1 illustrates, blade assembly 105 and mill 110 may comprise the only significant mechanical devices mounted atop tower 115. In other words, unlike the majority of existing wind generators which produce electricity, a generator may be located remotely, such as in powerhouse 165. By removing the generator from the top of tower 115, one may decrease the need for expensive tower materials and costly manufactured masts. By preventing tower 115 from being top-heavy, or at least decreasing the amount which tower 115 is top-heavy by locating the generator remotely, one may enhance or improve safety which may lead to reduced insurance premiums. For example, one may eliminate the need to raise and lower the generator. Another additional benefit which may be realized by removing the generator from the top of tower 115 may be the elimination of guy wires.

Mill 110 may be coupled to blade assembly 105 via the horizontal shaft. Mill 110 may transfer or convert the wind energy into a torque force that drives a mechanical pump (not shown in FIG. 1) mounted at the base of tower 115, wherein the pump is coupled to mill 110 via a vertical shaft 143 which couples mill 110 to the pump. Further, the pump may serve as a ballast for tower 115. In other words mill 110, may be driven by wind which turns blade assembly 105, wherein mill 110 translates the rotational energy of the horizontal shaft into rotational energy for the vertical shaft. The rotational energy of the vertical shaft may in turn drive the pump.

In some alternative embodiments, mill 110 may comprise an automatic transmission configured to work in conjunction the variable pitch mechanism of blade assembly 105. The automatic transmission may improve the operation of the pump in conditions of low wind velocity, as well as limit friction and vibration in conditions of high wind velocity. But the automatic transmission mechanism and the variable pitch mechanism may be operated in conjunction with each other to maximize output from the pump relatively quickly in conditions of low wind speed, yet limit the rotational speed of the vertical shaft so as not to exceed the maximum-rated rotational input speed of the pump during conditions of high wind velocity.

As illustrated in FIG. 1, tower 115 has two hinge assemblies 117 at mid-location 130 on the structure so that the hinge assemblies may be configured to lay down the majority of the overall structure to an anchoring frame 127 at the level of man-made flume 125 for maintenance or harsh weather conditions that threaten the wind capturing system of the top of tower 115. For example, a hoist 144 may be coupled to cable 135 and routed about level arm and pulley assembly 140.

During times of scheduled maintenance or impending severe weather, such as a hurricane, hoist 144 may be manipulated to loosen the tension of cable 135, while at the same time a person tightens or applies increasing amounts of tension to a second cable, not shown for clarity of illustration, attached to the top of tower 115. Continuing to loosen the tension of cable 135 while increasing the tension of the second cable attached to the top of tower 115 may cause the top of tower 115, which includes blade assembly 105 and mill 110, to fold over toward service deck 150 until resting upon anchoring frame 127.

Upon the completion of the scheduled maintenance, or after the passage of the severe weather, a reverse procedure may be employed to raise the top of tower 115 back to its operating or upright position. As hoist 144 retracts cable 135, the tension applied to the top of tower 115 about level arm and pulley assembly 140 may cause the top of tower 115 to rotate about hinge assemblies 117 until the top of tower 115 is in the full-upright and operating condition as depicted in FIG. 1.

To facilitate the lowering of the top of tower 115, vertical shaft 143 may be divided into two sections comprising an upper section in the lower section. The upper and lower sections may intersect or join each other at the height of the two hinge assemblies 117. The upper section and the lower section may mate or join together with a coupling assembly. For example, the coupling assembly may comprise a section of pipe having one or two holes which traverse each end of the pipe. The pipe, which may form a sleeve when slid onto the top of the lower section of vertical shaft 143, may be slid up onto the bottom of the upper section of vertical shaft 143 when the top of tower 115 is in the full upright position, such that the pipe is surrounding both ends of the upper and lower sections of vertical shaft 143 where the ends mate together. The pipe or sleeve may be held in position, and mechanically couple the upper and lower sections of vertical shaft 143, via cotter pins inserted into the holes of the sleeve and corresponding holes drilled through the ends of the upper and lower sections of vertical shaft 143. When the top of tower 115 needs to be lowered, the cotter pins may be removed, enabling the pipe or sleeve to slide down onto the lower section of vertical shaft 143 and enabling the upper section of vertical shaft 143 to move freely as the top of tower 115 is folded down.

In the embodiment depicted in FIG. 1, the two hinge assemblies 117 are located at an approximate height equal to the top of flume 125, which coincides with approximately one third (⅓) the height of tower 115. In alternative embodiments hinge assemblies 117 may be located at different locations of tower 115. For example, the two hinge assemblies 117 may be located at the next truss intersection closer to the top of tower 115, wherein a smaller portion of tower 115 would need to be lowered and raised. Stated differently, one possessing ordinary skill in the art will appreciate that the hinge assemblies may be located at numerous points of the structure of tower 115, while still enabling the top of tower 115 to be lowered and raised.

In the embodiment of FIG. 1, the pump is submerged below the surface of a reservoir or body of water 155. The pump is stationary and, when driven by vertical shaft 143, pumps water from body of water 155 to a low-level hydraulic head and outfall 120 into man-made flume 125. Man-made flume 125 temporarily stores the water and gradually transfers the water by gravity feed to the other end of man-made flume 125 located at powerhouse 165. Man-made flume 125 provides the medium for an aquaculture environment in which aquatic life may be bred and raised in captivity for consumption or natural conservation.

Blade assembly 105, mill 110, and the pump may supply a near-constant flow of water from body of water 155 to provide fresh medium for the aquatic life as it kept in man-made flume 125 for eventual harvest. Man-made flume 125 may be designed to store the water, to act as a sort of capacitance, which may allow for smooth and continuous flow of water across the turbine at the exit point of man-made flume 125. Storing water in man-made flume 125 may help remove the necessity of dealing with varying gusts of wind, which may in turn reduce the or eliminate the need to include elaborate and expensive electrical components at the output of the generator, because the fluctuations in electrical power generation may be minimized or eliminated.

The types of species of aquaculture that may be raised in man-made flume 125 may vary. For example, various embodiments may raise different species of fish, different species of shrimp, different species of crabs, and different species of turtles. Raising such species as sea turtles may have the auxiliary benefit of raising endangered species of turtles in controlled environments in order to increase their populations in the coastal areas of the Gulf of Mexico. A fresh and continuous flow of seawater may flow from the pump into man-made flume 125. Additionally, some embodiments may raise multiple species in a single flume. For example, screens may separate various sections of the flume, as well as the various species located within the different sections.

The pump employed may vary depending on the embodiment. For example, some embodiments may employ positive displacement pumps, such as internal gear pumps, screw-type pumps which may include various types of Archimedes screw-types assemblies and hydraulic rotary-tube pumps, shuttle block pumps, flexible vane or sliding vane pumps, circumferential piston pumps, helical twisted roots pumps, progressive cavity pumps, rotary-type or roots-type pumps, lobe pumps, peristaltic pumps, and reciprocating-type pumps. As one skilled in the art will appreciate, various types of pumps may be mounted in various locations, some being submerged with others being mounted above body of water 155, such as on service deck 150 at the base of tower 115. Additionally, various types of gear assemblies may need to be employed to accommodate the type of pump used. For example, gear assemblies may be needed to increase or decrease the rotational speed of vertical shaft 143. Alternatively and/or additionally, mill 110 may need to be modified or replaced to change the movement of vertical shaft 143 from rotational to reciprocal. For example, the pump employed in an embodiment may comprise a diaphragm or piston-type pump, such that vertical shaft 143 may need to move up and down in a reciprocal motion to drive the pump.

Figure 2:
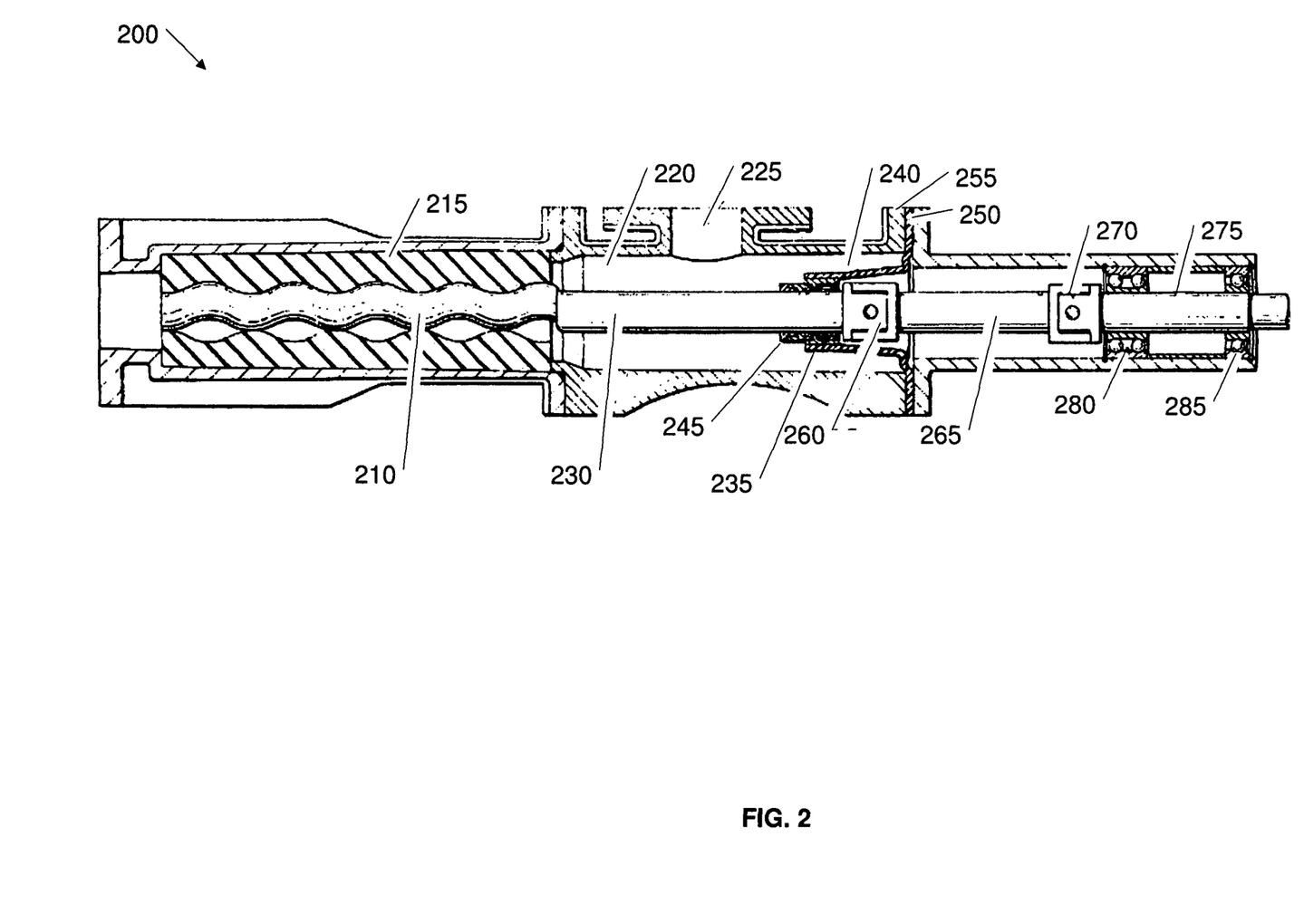
FIG. 2 depicts an embodiment of an eccentric worm positive displacement pump.

FIG. 2 depicts an embodiment of an eccentric worm positive displacement pump 200 having a helical rotor 210. Helical rotor 210 may be formed of metal, and located within a stator 215. Stator 215 may be formed of an elastomer such as a hard rubber. Rotor 210, at any one point along the rotor section, may form a circular cross-section. However, rotor 210 may be shaped to form a helix, wherein the helical rotor may be rotated inside stator 215. Stator 215 may have a rounded helical groove, wherein the rotor axis may be offset from the stator axis such that helical rotor 210, as it is rotated and moved in a circular path, has moving contact with stator 215 along the helical groove to form a displacement pump.

In the embodiment depicted in FIG. 2, rotor 210 may be driven from the inlet end although it will be readily apparent that it could equally well be driven from the outlet end. At the inlet end of the stator, there is a cylindrical inlet chamber 220 connected to an inlet port 225. Extending through inlet chamber 220 is a connecting member 230 rigidly secured to rotor 210. Connecting member 230, which may be of circular form, may be parallel to but offset from the axis of inlet chamber 220. Connecting member 230, near the end remote from rotor 210, may be carried in a bearing 235. Bearing 235 may be supported in a resilient mount 240 having the general form of a frustum of a cone, the narrower end of resilient mount 240 being sealed to the outer bearing race. Pump 200 comprises a sealing member 245 connecting member 230 adjacent the end of bearing 235 to prevent any ingress of fluid into bearing 235 along connecting member 230.

At its wider end, the conical resilient mount 240 comprises an outwardly-directed flange 250 which is clamped between a flange 255 on the end of an annular wall of inlet chamber 220 and an end plate for inlet chamber 220 so as to form a fluid-tight seal between resilient mount 240 and the wall of inlet chamber 220. Beyond bearing 235, connecting member 230 is connected by a first universal joint 260 to a connecting shaft 265 which in turn is connected by a second universal joint 270 to a drive shaft 275 (which may correspond to vertical shaft 143 in FIG. 1) in bearings 280 and 285. As one possessing ordinary skill in the art will appreciate, with the construction described, the two universal joints 260 and 270 may be completely sealed from the fluid in inlet chamber 220. In inlet chamber 220, connecting member 230 may move around a circular path permitting large particles to pass freely into the pump. The movement of connecting member 230 may help prevent clogging the region around the inlet to stator 215.

As described, an embodiment of system 100 depicted in FIG. 1 may employ pump 200. Some alternative embodiments, however, may employ other types of pumps. For example, system 100 may employ a series of gears and employ a velocity-type pump, such as a centrifugal pump, radial flow pump, axial flow pump, mixed-flow pump, or eductor-jet pump, as just a few examples.

Consistent with numerous variations of tower sizes, blade assembly sizes, and available reservoirs, man-made flume 125 may be scaled to accommodate the marine life being bred. For example, in systems having relatively large blade assemblies 105 and correspondingly large pump assemblies capable of pumping relatively large quantities of water, the size and volume of the associated man-made flume may be substantially large. Conversely, in systems having relatively small blade assemblies 105 and correspondingly smaller pump assemblies, the size and volume of the associated man-made flume may be relatively small. The size and/or volume of the man-made flume may depend on a variety of factors, which may include among other things anticipated wind speeds, corresponding pump flow capabilities based on the different wind speeds, minimum and maximum water flow requirements for the turbines and generators, and the resulting flume water volumetric flow rate necessary to satisfy the aeration requirements necessary to sustain the aquaculture.

In many embodiments, body of water 155 may comprise a saltwater reservoir. For example, body of water 155 may comprise saltwater on a beach of an ocean or a gulf, saltwater of a marshland area, or saltwater of a bay, as only a few examples. In numerous alternative embodiments, however, body of water 155 may comprise fresh water. For example, body of water 155 may comprise a pond or a river.

Water flowing from the exiting end of the man-made flume 125, at powerhouse 165, may impact a water turbine. In other words, the flowing water which exits man-made flume 125 may impact a rotary engine that takes energy from the moving water and uses the energy to create electricity via a generator coupled to the turbine. Screening mechanisms may be positioned to keep the marine life from entering the turbine area.

Depending on the configuration of the overall system, including such parameters as the pumping elevation from body of water 155 to the elevation of the man-made flume 125 or the volumetric flow rate specified, the type of water turbine employed may vary. In some embodiments, the water turbine may employ a Pelton wheel. In other embodiments, the water turbine may comprise a type of Francis turbine. A large majority of system configurations may have a low head and utilize a Kaplan turbine. For example, in many embodiments, the turbine may comprise a Kaplan turbine, having a plurality of automatically-adjusted propeller blades with automatically-adjusted wicket gates to achieve efficiency over wide ranges of water flow and water head.

Turbine selection may be primarily based on the available water head, and secondarily based on the available flow rate. System configurations with relatively high head sites may employ impulse turbines. System configurations with relatively low head sites may employ reaction turbines. A number of system configurations may employ Kaplan turbines, wherein the turbines have adjustable blade pitch and be well-adapted to wide ranges of flow or head conditions. Having adjustable blade pitch, the Kaplan turbine configurations may achieve peak efficiencies over varying ranges of water heads and flowing conditions.

In some system configurations, such as systems that have small turbines, the turbines may employ horizontal shafts. Other system configurations, especially systems that employ larger turbines, may employ vertical shafts to more efficiently utilize the available head. System configurations that employ Pelton wheels may comprise either vertical or horizontal shaft machines. In some embodiments, impulse turbines may employ multiple water jets to increase specific speed and balance shaft thrust.

Figure 3:
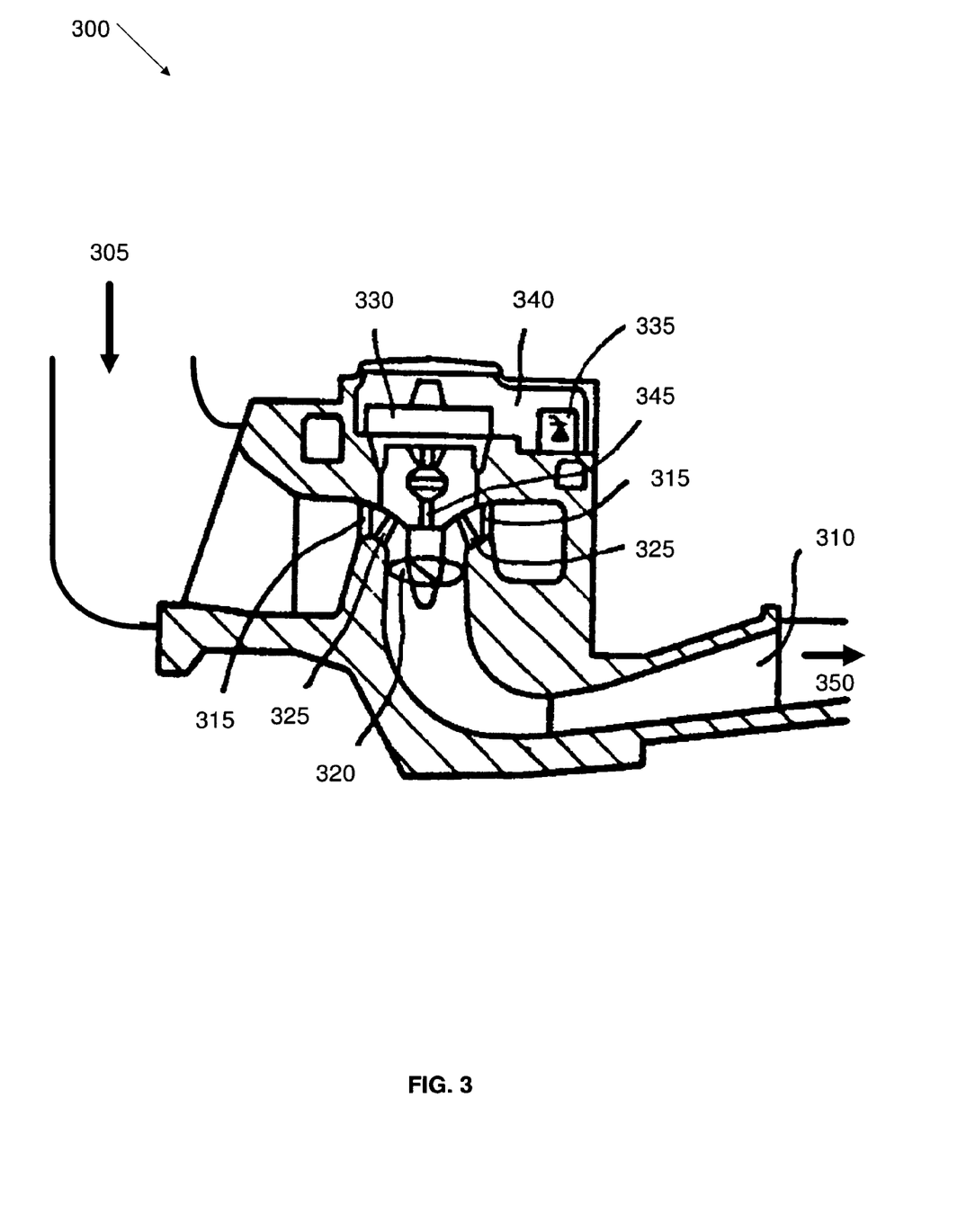
FIG. 3 depicts a turbine and generator set.

FIG. 3 depicts a turbine and generator set 300 according to one or more embodiments. As illustrated in FIG. 3, turbine and generator set 300 comprises an axial turbine set with a vertical shaft 345 and is designed as a propeller turbine 320, with vertical shaft 345 driving a generator 330. Turbine and generator set 300 comprises a tubular driving water space 310. Between sets of blades 315, there is provided propeller turbine 320 having a runner with adjustable blades 325 disposed near the front end of propeller turbine 320. Water may enter (element 305), impact and turn propeller turbine 320, and exit (element 350). The runner may be constructed as a one-piece device that has blades integrally cast with a hub and an outer rim. The outer rim may be sealed against the turbine housing and carry a rotor of a generator 330.

A stator winding of generator 330 may feed a distribution network at a constant frequency, e.g. 60 Hz, via a frequency-controllable direct converter 335. Direct converter 335 may comprise a low generator-side frequency. For example, generator 330 may be rated for frequencies less than 20 Hz and have a much higher degree of utilization than a 60 Hz machine. Due to the frequency controllability of the direct converter 335, the generator 330 and the propeller turbine 320, direct converter 335 may be continuously and freely varied relative to the speed, so that an optimum speed can be set on the propeller turbine 320 for every load. Thus, even at partial loads, despite the use of the mechanically very sturdy propeller turbine 320 with non-adjustable blades, a very good efficiency may be obtained in partial load operation.

As depicted in FIG. 3, some embodiments may locate direct converter 335 in casing 340 of the tube turbine set. In many embodiments, generator 330 and/or direct converter 335 may be located external to casing 340. For example, in some embodiments, generator 330 may be located several feet away from casing 340. Remotely locating generator 330 may facilitate such things as convenient servicing and repair. In numerous embodiments, direct converter 335 may instead comprise a converter located external to casing 340. For example, generator 330 may generate an alternating current (A/C) waveform. Generator 330 may transfer the AC waveform to the remote converter over a period of years. Locating the converter circuitry in a remote location may have several advantages, such as decreasing the unit cost of the turbine assembly or placing the converter circuitry in a much more hospitable environment.

The water, once passing through turbine and generator set 300 may be transferred by gravity feed to return to body of water 155. As FIG. 1 illustrates, the turbine and generator set may be housed in a structure like powerhouse 165. Powerhouse 165 may be equipped with an overhead-type lifting mechanism, such as a chain hoist, positioned to lift and remove plates in the floor. Removal of such floor plates may allow ease of access for servicing generator and turbine. Also, using the chain hoist, both the turbine and the generator may be lifted from their operating positions and removed for storage, maintenance, replacement, or evacuation in harsh weather conditions. Further, powerhouse 165 may be elevated to allow a service vehicle to drive beneath the structure and allow the mechanical lift to lower either the turbine or generator to the service vehicle for possible removal once the removable floor plates are for access. In the embodiment depicted in FIG. 1, the scale of system 100 is sized to allow the primary parts (generator, turbine, wind gathering devices) to be removed in hurricane-type environments by one service vehicle, equipped with basic tools, and approximately four men.

The tower 115, service deck 150, supporting members 145, man-made flume 145 may all be constructed using commonly-available materials found at most hardware stores or lumber yards, using common techniques of carpentry, mechanics, civil engineering design, and marine biology. For example, tower 115, service deck 150, and supporting members 145 may be constructed using marine-grade wood. Man-made flume 125 may be built using a combination of marine-grade plywood encapsulated in fiberglass or other epoxy-type resins. Many embodiments may be constructed for operation near coastal regions with low-lying water sources such as bayous and swamps. Such water sources may be utilized for marine aquaculture and power generation. Excess power generated by system 100 may be sold by connecting and delivering the power to the local power grid, provided the proper equipment is used to interface with the power grid.

As one possessing ordinary skill in the art will appreciate, the configuration of system 100 depicted in FIG. 1 is only one embodiment. Numerous elements may be changed and/or modified consistent with the teachings of the invention. For example, while the embodiment depicted in FIG. 1 has a single tower 115, some embodiments may have multiple towers. For example, an embodiment may have three towers, each with its own blade assembly and pump, to transfer water to a single man-made flume 125. Alternatively, other embodiments may have a single tower and blade assembly which pumps water to two or more man-made flumes. For example, one flume may be used to harvest one species while another flume is used to harvest a different species. A more specific example would be to place a type of fish in one flume while placing shrimp in a second flume. Separating fish from shrimp in this manner may be desirable to keep the fish from consuming the shrimp.

Even further embodiments may have other types of changes and/or modifications. For example, a single tower 115 and blade assembly 105 may be used to drive two or more pumps. Some embodiments may have dual turbine and generator assemblies in powerhouse 165.

In such embodiments, a single flume be large enough to provide water flow to both turbines via separate exit flows. Such a configuration may be beneficial, for example, to accommodate varying wind conditions. During conditions of high wind velocities, the tower and pumps may supply enough water to operate both turbine and generator assemblies. However, when the wind velocities drop, the system may be automated to detect that the water flow is insufficient to operate both lines. Upon detecting the low flow condition, the system may automatically shut down one of the lines, such as by stopping the flow of water by an automated control valve.

Even further embodiments may employ equipment not depicted in FIG. 1 nor described in the aforementioned discussion. In some embodiments, in addition to man-made flume 125, or in lieu of increasing the size of man-made flume 125, another type of water storage technology may be employed. For example, an embodiment may first pump water into a holding tank. The holding tank may provide additional storage for the water, to help ensure that the aquaculture receives sufficient water circulation in man-made flume 125, even during extended periods of low wind flow. The holding tank may have an automated level control system that monitors the level in the tank and tries to maintain a relatively high level (90% or more), yet provides a minimum flow regardless of tank level to ensure that the aquaculture receive a minimum amount of water circulation which may be necessary to support aquatic life.

Figure 4:
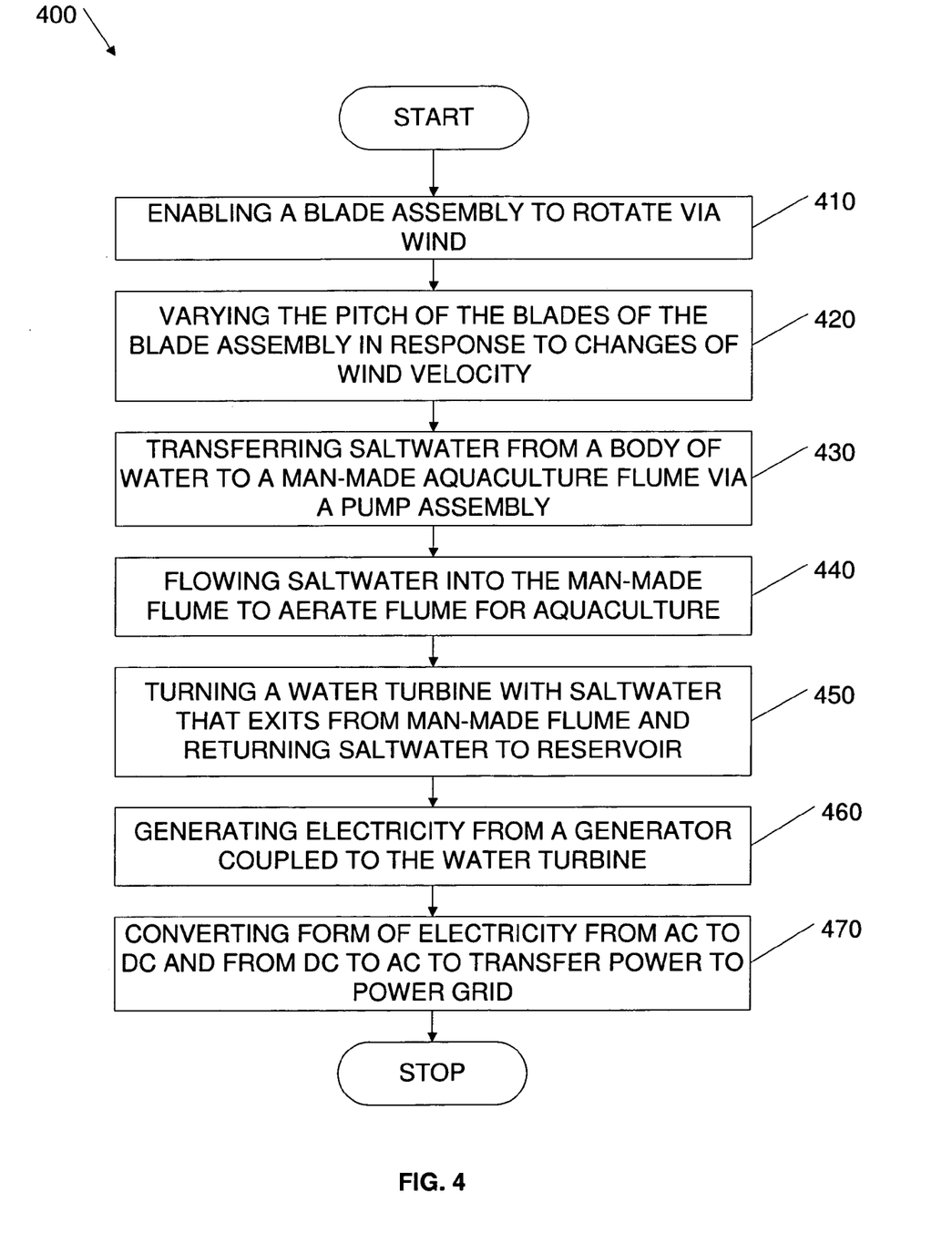
FIG. 4 is a flowchart 400 illustrating how to generate electrical power via a hydro-electric system that employs a man-made flume configured to support saltwater aquaculture.

FIG. 4 shows a flowchart 400 illustrating how to generate electrical power via a hydro-electric system that employs a man-made flume configured to support saltwater aquaculture. As illustrated in FIG. 4, the process may begin by enabling a blade assembly to rotate via wind (element 410) and varying the pitch of the blade assembly in response to changes of wind velocity (element 420). For example, with reference to FIG. 1, one may affix a propeller assembly or wind wheel comprising a plurality of blades, or curved sails, to the top of a tower structure (element 115). The tower 115 may be located in a marshland having an available reservoir of saltwater, such as in a swamp area adjacent to an edge of the Intracoastal Waterway.

The propeller assembly may comprise an automated governor system that reacts to the speed (RPMs) that the propeller assembly rotates about it horizontal axis. As wind speeds increase, the propeller assembly may rotate at relatively higher RPMs. In response to experiencing the higher RPMs, the governor assembly may respond by adjusting the pitch of the blades of propeller assembly (element 430). In conditions of high wind speeds, the governor may adjust the pitch of the blades and cause the blades to flatten with respect to the wind as it impacts the blades.

The governor may cause the propeller assembly to flatten its blades, catch less wind, and consequently reduce the rotational speed of the propeller assembly about the horizontal axis. Additionally, when the wind velocity drops, the governor assembly may be spring-loaded which causes the blades to catch increasing amounts of air when the rotational speed of decreases from lower wind velocity. As one having ordinary skill in the art will appreciate, such a governor may provide a mechanical self-feedback loop to help maintain the speed of the propeller assembly relatively constant in varying wind conditions.

As the propeller assembly rotates in the wind, the tower assembly may also comprise a windmill gearbox assembly which converts the rotational energy of the horizontal shaft of the propeller assembly into reciprocal energy in an attached vertical shaft. For example, the gearbox may couple the rotating horizontal shaft with two drive gears that in turn cause two Pitman arms to pump up and down in a cyclical fashion. The Pitman arms may be coupled to the vertical shaft, causing the vertical shaft to also move up and down. The vertical shaft may span the height of the tower 115 and drive a pump located at its base. The reciprocal motion of the vertical shaft may drive the pump, transferring saltwater from the Intracoastal waterway to a man-made flume 125, so that the flowing saltwater may aerate the man-made flume in order to support aquaculture in the flume (elements 430 and 440).

The pump transfers the saltwater from the Intracoastal Waterway, which is at a first low elevation, to the man-made flume 125, which is at a second elevation appreciably greater than the first elevation. For example, the bottom of the man-made flume 125 may be at a height which is 20 or 30 feet higher that the surface level of the water of the Intracoastal Waterway. The change in elevation may vary from embodiment to embodiment, being lesser or greater depending on such factors as the turbine and generator technologies employed.

The saltwater may flow by gravity from one end of the man-made flume 125 to an exit point of the flume and freefall onto a turbine assembly before flowing back to the Intracoastal Waterway (element 450). The turbine may be coupled to a generator, wherein the freefall of water onto the turbine assembly may cause the generator to produce electrical energy (element 460). While some generators may produce DC current, many generators may produce AC current. A power conditioning system may receive either the DC current or the AC current. If the power has AC current the power conditioning system my first convert it to DC current before converting the DC current back to AC current (element 470). However, if the generator produces DC current directly, the power conditioning system may simply take the DC current and convert it back to AC current. By converting the power generated by the generator into AC current, the power conditioning system may be able to match the voltage magnitude and frequency of the regional electrical power distribution network, so that the power may be transferred onto the grid (element 470).

Flowchart 800 of FIG. 8 illustrates only one process. Alternative embodiments may implement innumerable variations of flowchart 800. For example, instead of utilizing saltwater, the system may utilize water from a freshwater reservoir. Other variations, with more elements and fewer or different elements, are possible for alternative embodiments.

Those skilled in the art, having the benefit of this disclosure, will realize that the present disclosure contemplates methods and systems to generate electrical power via hydroelectric systems that employ man-made flumes configured to support saltwater and freshwater aquaculture. The form of the embodiments shown and described in the detailed description and the drawings should be taken merely as examples. The following claims are intended to be interpreted broadly to embrace all variations of the example embodiments disclosed.

Although the present disclosure and some of its advantages have been described in detail for some embodiments, one skilled in the art should understand that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
  rotating, via wind, a blade assembly;
  transferring, via a mechanical pump assembly coupled to the blade assembly, saltwater from a first elevation to an entry point of a man-made flume, wherein the entry point is at a second elevation, and wherein the second elevation is greater than the first elevation, and wherein the man-made flume comprises aquaculture;
  flowing saltwater in the man-made flume from the second elevation to an exit point at a third elevation, wherein the third elevation is greater than the first elevation;
  turning a water turbine with saltwater that flows from the exit point of the flume; and
  generating electrical power via a generator coupled to the water turbine.

2. The method of claim 1, further comprising: returning saltwater exiting the water turbine to the first elevation.

3. The method of claim 1, further comprising: converting the form of the electrical power from alternating current (AC) to direct current (DC).

4. The method of claim 3, further comprising: converting the DC electrical power to second form of AC electrical power via an inverter, synchronizing the frequency of the second form of AC electrical power with a frequency of a distribution grid, and transferring the second form of AC electrical power to the distribution grid.

5. The method of claim 1, further comprising: varying, via an automated pitch assembly, pitch of the blades of the blade assembly, wherein the varying comprises automatically decreasing pitch of the blades as speed of the wind increases and automatically increasing pitch of the blades as speed of the wind decreases.

6. The method of claim 1, wherein the transferring, via the mechanical pump assembly coupled to the blade assembly, saltwater from the first elevation comprises driving a mill that turns a substantially vertical shaft which couples the blade assembly to the mechanical pump assembly.

7. The method of claim 6, further comprising: altering the rotational speed of the substantially vertical shaft via an automatic transmission assembly that couples the mill to the substantially vertical shaft.

8. A system, comprising:
  a blade assembly to rotate a first shaft when the blade assembly is impacted by wind, wherein the first shaft is substantially horizontal relative to ground;
  a mill coupled to the first shaft and to a second shaft, wherein the second shaft is substantially vertical relative to the ground, and wherein the mill is configured to rotate the second shaft in response to rotation of the first shaft;
  a pump coupled to the second shaft, wherein the pump transfers saltwater from a body of water to a man-made flume, wherein the man-made flume is at an elevation greater than the body of water, and wherein the man-made flume comprises aquaculture; and a turbine arranged to turn a shaft of a generator in response to saltwater flowing from the man-made flume, wherein the generator is configured to generate electrical power.

9. The system of claim 8, wherein the blade assembly comprises a wind wheel.

10. The system of claim 9, wherein the turbine comprises a Kaplan turbine.

11. The system of claim 10, wherein the aquaculture comprises shrimp.

12. The system of claim 9, wherein the turbine comprises a Pelton wheel.

13. The system of claim 9, wherein the turbine comprises a Francis turbine.

14. A system for supporting saltwater aquaculture, the system comprising:
   a tower, wherein the tower comprises a plurality of hinges;
   a propeller assembly coupled to the tower, wherein the propeller comprises a plurality of blades, wherein the propeller assembly is configured to be impacted by wind and rotate a shaft that is substantially vertical to the ground;
   a pump, coupled to the shaft, to pump saltwater from a body of saltwater into a man-made flume, wherein the plurality of hinges enable the tower to fold onto the man-made flume, wherein the man-made flume comprises aquaculture, wherein the pump is coupled to the shaft of the propeller assembly by a gearbox and a pump rod, wherein the pumprod couples the gearbox with the pump, wherein the pump rod comprises two sections, the two sections being coupled together by a pin and sleeve assembly, and wherein the pin and sleeve assembly enables the top section of the pump rod to move with the top assembly of the tower when folded onto the man-made flume; and
   a turbine coupled to a generator, wherein the generator is configured to generate electricity in response to saltwater flowing from the man-made flume and impacting the turbine.

15. The system of claim 14, wherein the propeller assembly comprises a wind wheel comprising at least eighteen blades.

16. The system of claim 14 wherein the blade assembly comprises variable pitch blades and a mechanical governor that varies the pitch of the blades in response to changes of wind velocity.

17. The system of claim 14 wherein the man-made flume comprises a plurality of screens and is configured to support the life of shrimp.

18. The system of claim 14, further comprising an automated pitch assembly, wherein the automated pitch assembly is configured to vary the pitch of the plurality of blades in response to speed of the wind.

19. The system of claim 14, wherein the gearbox comprises a windmill gearbox.

20. They system of claim 14, wherein the turbine comprises a Kaplan turbine.

\* \* \* \* \*